US 8,120,583 B2

(12) United States Patent
Huang et al.

(10) Patent No.: US 8,120,583 B2
(45) Date of Patent: Feb. 21, 2012

(54) KVM SWITCH CAPABLE OF DETECTING KEYWORD INPUT AND METHOD THEREOF

(75) Inventors: Shih-yuan Huang, Shijr (TW); Chih-tao Hsieh, Shijr (TW)

(73) Assignee: ATEN International Co., Ltd., Shijr (TW)

( * ) Notice: Subject to any disclaimer, the term of this patent is extended or adjusted under 35 U.S.C. 154(b) by 1174 days.

(21) Appl. No.: 11/530,367

(22) Filed: Sep. 8, 2006

(65) Prior Publication Data

US 2008/0062132 A1  Mar. 13, 2008

(51) Int. Cl.
*G09G 5/00* (2006.01)
(52) U.S. Cl. ........ 345/168; 709/201; 709/218; 709/219; 710/1; 710/74
(58) Field of Classification Search ........... 345/156–172
See application file for complete search history.

(56) References Cited

U.S. PATENT DOCUMENTS

| | | | | |
|---|---|---|---|---|
| 5,931,297 | A * | 8/1999 | Weill et al. | 206/320 |
| 6,557,170 | B1 * | 4/2003 | Wilder et al. | 725/130 |
| 7,478,182 | B2 * | 1/2009 | Schweig | 710/73 |
| 7,546,334 | B2 * | 6/2009 | Redlich et al. | 709/201 |
| 2003/0046311 | A1 * | 3/2003 | Baidya et al. | 707/200 |
| 2003/0053003 | A1 * | 3/2003 | Nishi et al. | 348/744 |
| 2004/0168030 | A1 | 8/2004 | Traversat et al. | |
| 2004/0205276 | A1 | 10/2004 | Ferguson | |
| 2004/0215742 | A1 | 10/2004 | Cook et al. | |
| 2004/0222944 | A1 | 11/2004 | Sivertsen | |
| 2004/0225952 | A1 | 11/2004 | Brown et al. | |
| 2004/0233234 | A1 | 11/2004 | Chaudhry et al. | |
| 2004/0268012 | A1 | 12/2004 | Ferguson | |
| 2005/0033987 | A1 | 2/2005 | Yan et al. | |
| 2005/0044266 | A1 | 2/2005 | O'Neil | |
| 2005/0044542 | A1 | 2/2005 | Grimaud et al. | |
| 2005/0060567 | A1 | 3/2005 | Shannon et al. | |
| 2005/0063108 | A1 | 3/2005 | Voll et al. | |
| 2005/0076102 | A1 * | 4/2005 | Chen et al. | 709/220 |
| 2005/0083487 | A1 | 4/2005 | Hunt et al. | |
| 2005/0086300 | A1 | 4/2005 | Yeager et al. | |
| 2005/0104892 | A1 | 5/2005 | Covington et al. | |
| 2005/0132070 | A1 | 6/2005 | Redlich et al. | |
| 2005/0132087 | A1 | 6/2005 | Glinski et al. | |
| 2005/0138109 | A1 * | 6/2005 | Redlich et al. | 709/201 |
| 2005/0138110 | A1 | 6/2005 | Redlich et al. | |
| 2005/0172039 | A1 | 8/2005 | Hsu | |
| 2005/0175196 | A1 | 8/2005 | Chen | |
| 2005/0238186 | A1 | 10/2005 | Chen | |
| 2005/0267931 | A1 | 12/2005 | Chen | |
| 2005/0286790 | A1 | 12/2005 | Gilgen | |

(Continued)

*Primary Examiner* — Richard Hjerpe
*Assistant Examiner* — Jeffrey Steinberg
(74) *Attorney, Agent, or Firm* — Chen Yoshimura LLP

(57) ABSTRACT

Disclosed is a keyboard-video-mouse switch capable of detecting keyword input and recording video data from a computer and keyboard input data from a console and method thereof. The keyboard-video-mouse switch includes a keyword filter and a capture unit. The keyword filter detects whether a predetermined keyword is inputted from the console into the computer and the capture unit records video data if the predetermined keyword is detected. Moreover, the capture unit may record keyboard input data for a complete monitor. The keyboard-video-mouse switch of the present invention further includes an alarm and a keyword database. The alarm will alarm an administrator when the predetermined keyword is detected. The keyword database stores data of keystroke combinations, which is defined as predetermined keyword data for at least one input method.

30 Claims, 4 Drawing Sheets

U.S. PATENT DOCUMENTS

| | | |
|---|---|---|
| 2006/0057996 A1 | 3/2006 | Petrovic et al. |
| 2006/0106585 A1 | 5/2006 | Brown et al. |
| 2006/0111880 A1 | 5/2006 | Brown et al. |
| 2006/0119594 A1 | 6/2006 | Ahern et al. |
| 2006/0167642 A1 | 7/2006 | Ferrer et al. |
| 2006/0181480 A1 | 8/2006 | Yee et al. |

* cited by examiner

KVM SWITCH CAPABLE OF DETECTING KEYWORD INPUT AND METHOD THEREOF

FIELD OF THE INVENTION

The present invention generally relates to a keyboard-video-mouse switch, and more particularly to a keyboard-video-mouse switch capable of detecting keyword input and recording video data from a computer and keyboard input data from a console and the method thereof.

BACKGROUND OF THE INVENTION

For a business, its commercial secret is treasure, which is necessary to be kept confidential, not to mention a military base, which needs confidential communication always and strictly because of national security. In a web time like today, network can let people reach the place that can never be imaged. Therefore, most autonomous networks of aforesaid autonomies would have at least one administrator for supervising or monitoring all users' activity in the network for aforesaid reason. For example, a general monitoring method is to keep eyes on the respective data transmission flow rate of all users' computers, consoles or to set different authorization levels for different users in advance for this network area.

At present, a keyboard-video-mouse switch has already become a network management solution. Similar as being aforementioned, an administrator who is in charge of managing the network construction, which mainly consists of keyboard-video-mouse switches, also has to deal with such issue for keeping information confidential inside. An active monitoring method on the users' activity is to detect their keyword input from the consoles where the users are operating. Once a predetermined keyword is detected, the administrator gets a notice according to some pre-settings of the keyboard-video-mouse switch, such as, alarming to the related; starting to recording keyboard-video-mouse data from the console, which the user inputted a keyword and the corresponding computer. Unfortunately, there is no any keyboard-video-mouse switch realizing such consideration of detecting keywords so far.

Consequently, there is a need to develop a keyboard-video-mouse switch capable of detecting keyword input and recording video data from a computer and keyboard input data from a console and method thereof.

SUMMARY OF THE INVENTION

To solve the foregoing drawbacks in the prior art, it is an objective of the present invention is to provide a keyboard-video-mouse switch capable of detecting keyword input and recording video data from a computer and keyboard input data from a console and method thereof. Generally, the keyboard-video-mouse switch is coupled with a plurality of computers and a console.

The keyboard-video-mouse switch includes a keyword filter and a capture unit. The keyword filter detects whether a predetermined keyword is inputted from the console into one of the computers and the capture unit records video data from the one of the computers if the predetermined keyword is detected. Moreover, the capture unit can records keyboard input data for a faultless monitoring. The keyboard-video-mouse switch of the present invention further includes an alarm and a keyword database. The alarm alarms an administrator when the predetermined keyword is detected. The keyword database stores data of at least one keystroke combination, which is defined as predetermined keyword data for at least one input method. The keyword filter detects the predetermined keyword by comparing keyboard input data from the console with the predetermined keyword data stored in the keyword database. The keyboard-video-mouse switch further includes a storage device for storing the video data and the keyboard input data. The storage device can be a memory inside the keyboard-video-mouse switch. Alternatively, the storage device can be far away from the keyboard-video-mouse switch but coupled thereto via a network.

The method of the present invention, which is capable of detecting keyword input for the keyboard-video-mouse switch coupling the computers to the console, includes steps described below:

detecting whether a predetermined keyword is inputted from the console into one of the computers by a keyword filter; and recording video data from the one of the computers by a capture unit if the predetermined keyword is detected.

The method of the present invention further includes a step of comparing keyboard input data from the console with the predetermined keyword data in the keyword database before the detecting step. Furthermore, the method of the present invention includes alarming an administrator and storing the video data after the recording step. Specifically, the method of present invention may further records keyboard input data from the console for a faultless monitoring.

According to the present invention, the keyboard-video-mouse switch can record the video data from a computer and the keyboard input data from a console once a keyword input from a console is detected, then further alarms the administrator of the keyboard-video-mouse switch right away to achieve a secure monitoring once a user searches secured information related with the aforesaid keywords stored in the keyword database.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
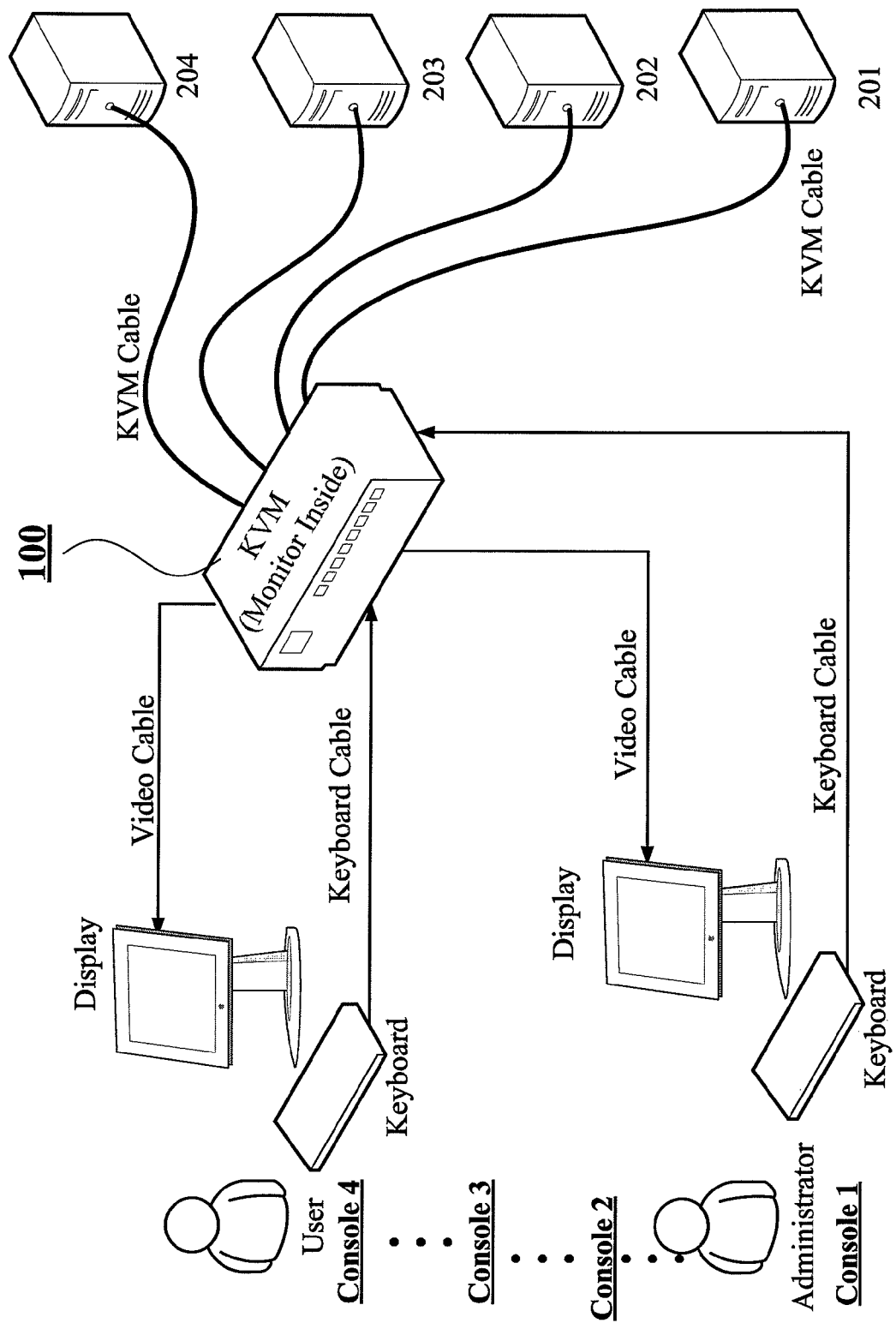
FIG. 1 illustrates a picture view of a keyboard-video-mouse switch coupled with four computers and four consoles; wherein the administrator can monitor the video data from the computer, which the user remote controls and the keyboard input data from the console, which the user operates according to the present invention.

Please refer to FIG. 1, which illustrates a picture view of a keyboard-video-mouse switch 100 coupled with four computers (201, 202, 203 and 204) and four consoles (console 1, console 2, console 3, and console 4). The administrator may monitor the video data from one of the computers, which is selected by the user, and monitor the keyboard input data from the console, which is operated by the user according to the present invention. In the embodiment of the present invention, the numbers of the computers and consoles coupled with the keyboard-video-mouse switch 100 are illustrated with four but those are not restricted to the present invention.

For instance, when an administrator works at the console 1 and a user is operating the computer 204 at console 4, if the user keys in a word "p-a-t-e-n-t", which has been inputted (defined) as a monitored keyword and stores in a keyword database of the keyboard-video-mouse switch 100 by the administrator in advance, the keyboard-video-mouse switch 100 automatically sends an alarm message to the console 1, and shows a warning, such as a "suspected intention-user name-console 1", on the display of the console 1 to let the administrator know that the user might want to dig some confidential information related with the keyword "p-a-t-e-n-t".

Moreover, the keyboard-video-mouse switch 100 may further transmits the video data from the computer 204, which is operated by the user, to the administrator's console 1 simultaneously to show the real-time operation status of the user on the display privately. Furthermore, the keyboard-video-mouse switch 100 may start to record the video data and the keyboard input data of the console 4 in a storage device as an evidence or a record for administrator's post-check if necessary. Specifically, the input method which can be detected, is not only English but also other input methods of different languages as long as input (define) write them into the keyword database beforehand.

Figure 2:
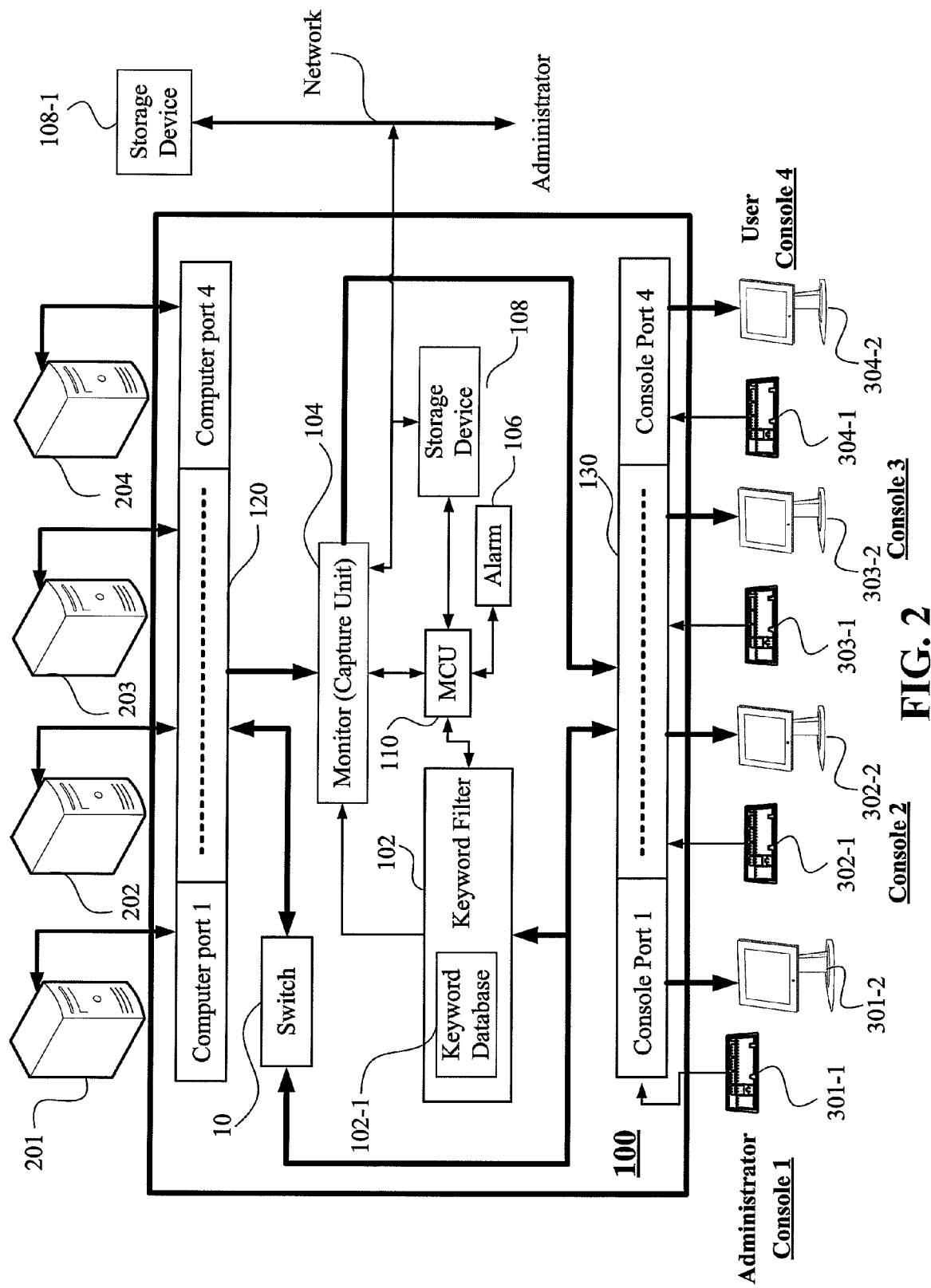
FIG. 2 illustrates a functional block diagram of keyboard-video-mouse switch of the present invention shown in FIG. 1.

Please refer to FIG. 2, which illustrates a functional block diagram of keyboard-video-mouse switch of the present invention shown in FIG. 1. The keyboard-video-mouse switch 100 includes a switch 10, a keyword filter 102, a keyword database 102-1, a capture unit 104, an alarm 106, a storage device 108, a micro control unit 110, a plurality of computer ports 120 and at least one console port 130. The computer port 120 further includes computer ports 1~4 for respective computers and the console port 130 further includes console ports 1~4 for respective consoles. The switch 10 is employed to route the keyboard-video-mouse signals among the computer ports 1~4 and the console ports 14. Therefore, the keyboard-video-mouse switch 100 is coupled with computers 201~204 via the computer ports 1~4 and coupled with the consoles (console 1~console 4) via the console ports 1~4. The console 1, which may be controlled by an administrator, includes a keyboard 301-1, a display 301-2 and a mouse, which is not shown. Same Similar as the console 1, the console 4, which may be controlled by a user, includes a keyboard 304-1, a display 304-2 and a mouse, which is not shown.

Mainly, the keyword filter 102 is in charge of detecting whether a predetermined keyword, such as "p-a-t-e-n-t", is inputted from the console 4 into the computer 204 or other computers. If the keyword input is detected, the capture unit 104 records video data from the computers 204 and stores the video data in the storage device 108. Meanwhile, the alarm 106 may alarm the administrator, who is near the console 1. Furthermore, the capture unit 104 may record and store keyboard input data from the console 4 as recording and storing the video data from the computer 204 as aforementioned. The micro control unit 110 is a processor for processing, controlling all aforesaid units, devices in the keyboard-video-mouse switch 100. Moreover, the keyword database 102-1 in this embodiment shown in FIG. 2 is inside the keyword filter 102 but it can be located outside the keyword filter 102 as an option. The keyword database 102-1 may store data of many keystroke combinations, defined as predetermined keyword data for input methods, such as English and Chinese. The way of the keyword filter 102 to identify if the keyword is inputted is to compare the keyboard input data from the console 4 with the keyword data pre-defined and stored in the keyword database. More detail about the comparison of the keyboard input data and the keyword data would be described later as referring to FIG. 3.

Specifically, the aforesaid storage device 108 can be a memory, which is not restricted in the keyboard-video-mouse switch 100. Therefore, the memory can be a storage device 108-1, which is coupled to the keyboard-video-mouse switch 100 via a network for keeping the recorded keyboard input data and the video data more confidential. Moreover, the aforesaid administrator is not restricted to operate at the console 1, either. The administrator also can supervise and monitor the whole network system, which is mainly constructed by the keyboard-video-mouse switch 100 via the network.

Figure 3:
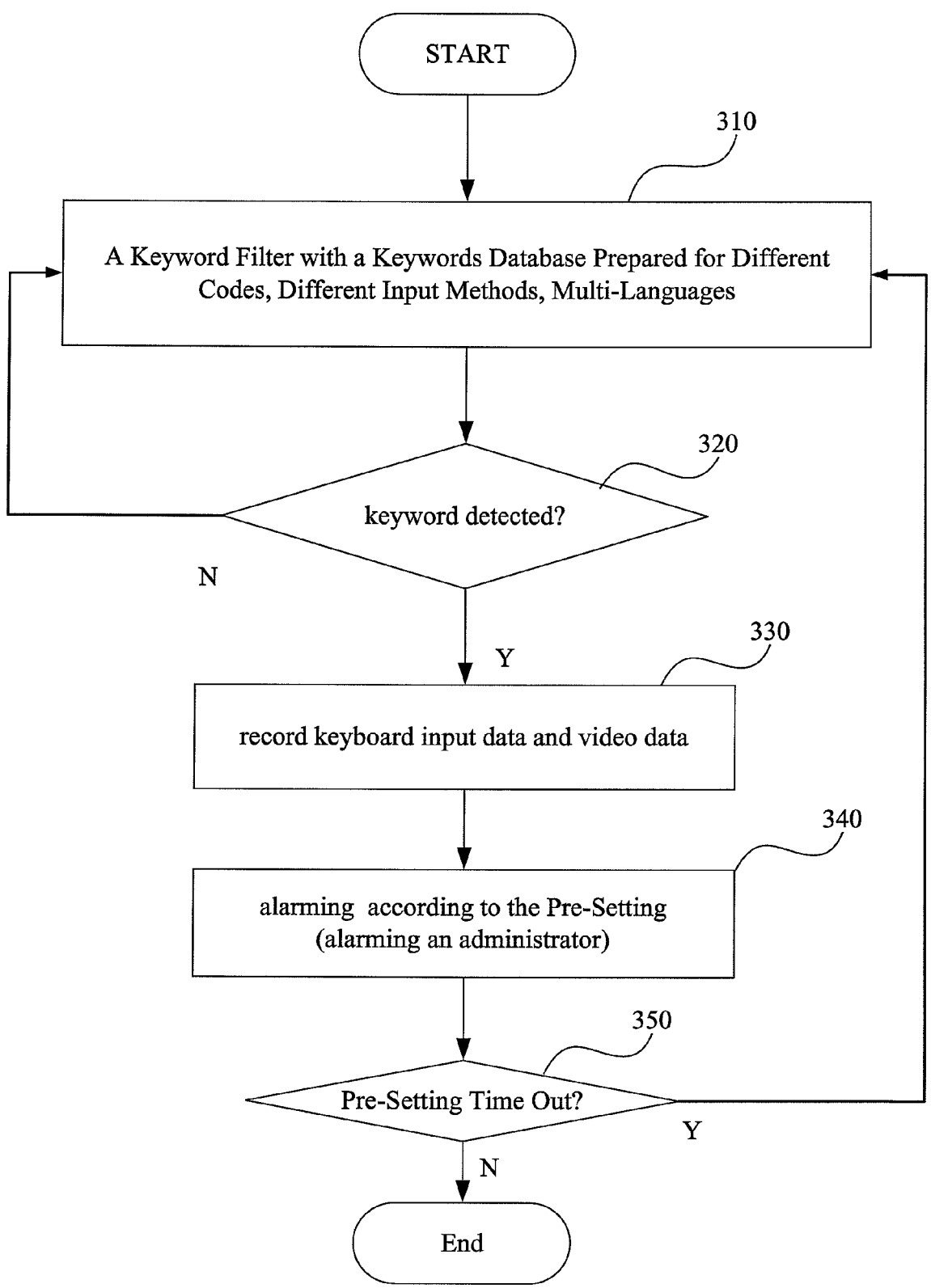
FIG. 3 shows a flow chart of a monitor procedure of the keyword input for different codes, different input methods and multi-Languages according to the present invention.

Please refer to FIG. 3, which shows a flow chart of a monitor procedure of the keyword input for different codes, different input methods or multi-Languages according to the present invention. A manufacturer of a keyboard-video-mouse switch may input (pre-define) keywords before delivering to the markets. Alternatively, an administrator of a keyboard-video-mouse switch may also input (define) keywords of at least one input method for monitoring and stores them in a keyword database according to their demands. In procedure 310, the administrator may input (define) keywords of ordinary input method in English, such as aforesaid "p-a-t-e-n-t". Moreover, the administrator may input keywords of Phonetic input method in Traditional Chinese, Hanzi keyboard input method in Traditional Chinese, Tsang-Jye input method in Traditional Chinese, Hanzi keyboard input method in Simplified Chinese or Roma-ji input method in Japanese according to practical demand.

Basically, for input methods in English and English-like languages, the comparison of the keyboard input data from one of the consoles and the keyword data in the keyword database may be performed by the keyword filter letter by letter. For aforesaid "p-a-t-e-n-t", once "p" is inputted at first, the comparison will be started, and next "a" is inputted, the comparison is going to be continued. If the next inputted letter is not "t", the comparison will be terminated and back to procedure 310. If the comparisons of the six letters are all matched in order, i.e. the keyword is detected as shown in procedure 320, the monitor procedure of the present invention will proceed to the next procedure 330, recording the keyboard input data and the video data as aforementioned. Furthermore, in procedure 340, the monitor procedure of the present invention may alarm according to the pre-settings of the keyboard-video-mouse switch, such as alarming the administrator by showing a "suspected intention-user name-console 1" warning on a display, sending a notice message to the administrator's cellular phone, buzzing for scaring the user, or directly locking the door of the room where the user is. In procedure 350, the monitor procedure of the present invention may not stop recording the keyboard input data and the video data until a time-out condition happens according to the pre-settings. If the time out condition happens, the monitor procedure of the present invention returns back to the procedure 310. If the time out condition does not happen, the capture unit shown in FIG. 2 keeps recording and storing the keyboard input data and the video data in the storage device. The time out condition can be illustrated as a stop command from administrator, a predetermined period of time for recording, or the aforesaid alarming according to the pre-settings of the keyboard-video-mouse switch had been executed completely. Furthermore, the comparison of the keyboard input data from one of the consoles and the keyword data in the keyword database also can be performed word by word. For aforesaid "p-a-t-e-n-t", until all the letters are inputted (after "space" keystroke or after "enter" keystroke), the comparison will not be started.

Specifically, for many different input methods in Chinese and Japanese languages developed from pictograph, there are BIG 5 code (Traditional Chinese), GB 2312 code (Simplified Chinese) and EUC Shift-JIS code (Japanese) for transforming the corresponding keyboard inputs into their special characters as standard. The comparison of the keyboard input data and the keyword data is performed character by character. For instance, according to Hanzi keyboard input method in Traditional Chinese, the word "patent law" is pronounced and inputted as "zhuan-li-fa". If the character "zhuan" is inputted at first, the comparison will be started, and next character "li" is inputted, the comparison is going to be continued. If the next inputted character is not "fa", the comparison will be terminated and back to procedure 310. If the comparisons of the three characters are all matched in order, i.e. the keyword "zhuan-li-fa" is detected as shown in procedure 320, the monitor procedure of the present invention will proceed to the next procedure 330, recording the keyboard input data and the video data.

Similar comparisons of Hanzi keyboard input method in Traditional Chinese as aforementioned are also executed for Phonetic input method in Traditional Chinese, Tsang-Jye input method in Traditional Chinese, Hanzi keyboard input method in Simplified Chinese or Roma-ji input method in Japanese if the administrator input s the keywords in different codes, different input methods and multi-Languages in advance. Furthermore, the method of detecting keyword according to the present invention is also suitable for handwrite input method, voice input method or other input methods for English, Chinese, Japanese or other languages according to the similar principle of the input coding thereof.

Figure 4:
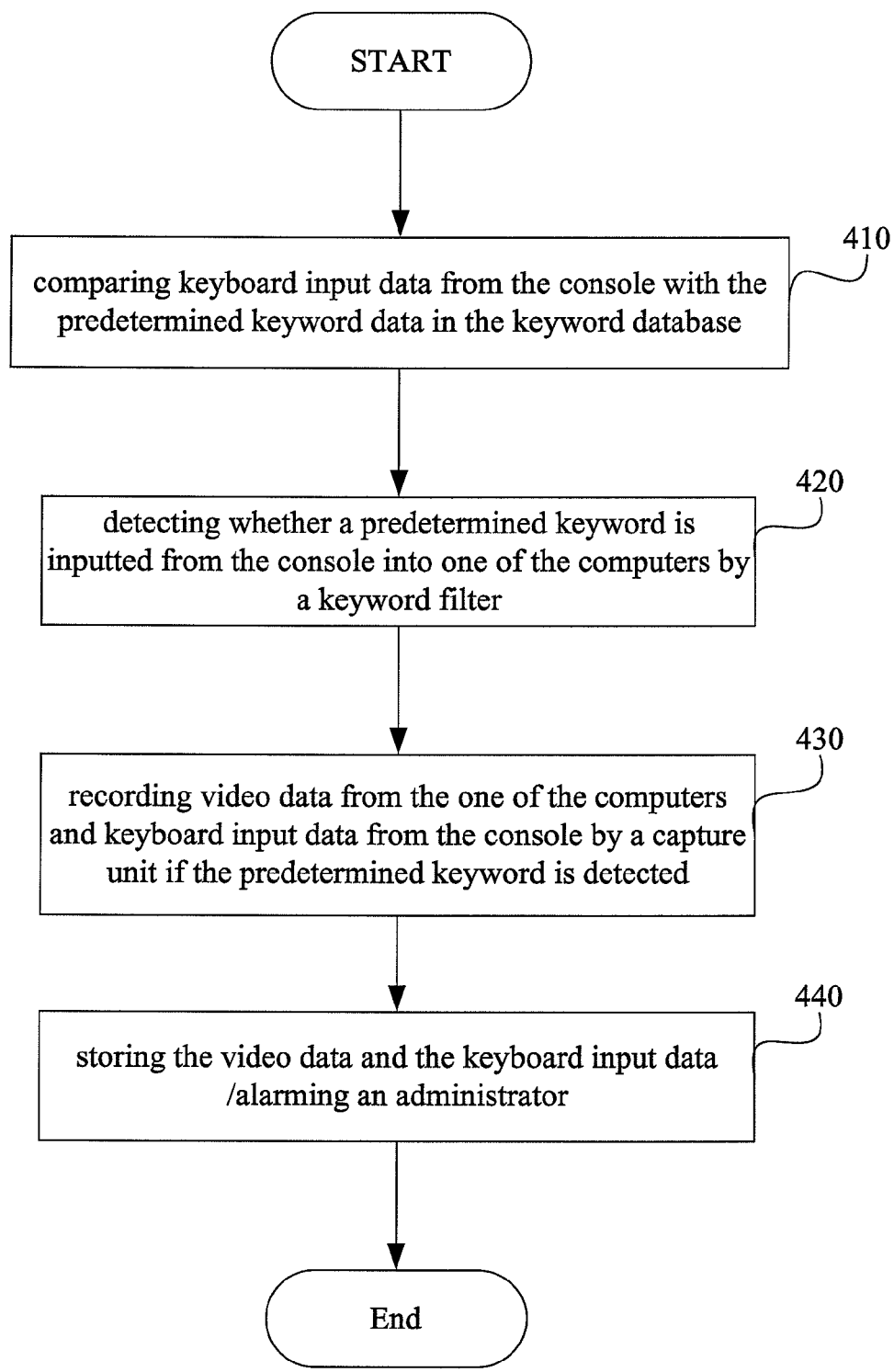
FIG. 4 shows a flow chart of a method for detecting keyword input for a keyboard-video-mouse switch according to the present invention.

Please refer to FIG. 4, which depicts a flow chart of a method for detecting a keyword input for a keyboard-video-mouse switch to accomplish the objectives of the present invention.

The present method includes the following steps:

Step 410, comparing keyboard input data from the console with the predetermined keyword data in the keyword database;

Step 420, detecting whether a predetermined keyword is inputted from the console into one of the computers by a keyword filter;

Step 430, recording video data from the one of the computers by a capture unit if the predetermined keyword is detected; and Step 440, storing the video data and the keyboard input data, and/or alarming and administrator.

According to the present invention, once a predetermined keyword inputted from a console is detected, the keyboard-video-mouse switch can record the video data from a computer and the keyboard input data from a console for different codes, different input methods or multi-Languages.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A keyboard-video-mouse (KVM) switch coupled with a plurality of computers, a first console and a second console, the system comprising:
    a first console interface coupled to the first console, which monitors the video data from one of the computers, and monitors an input data from the second console;
    a second console interface coupled to the second console;
    a keyword filter within the KVM switch, detecting whether a predetermined keyword is inputted from the second console into one of the computers;
    a capture unit coupled to the keyword filter for capturing the keyboard input data from the console and capturing video data from the one of the computers controlled by the second console, and recording the video data from the one of the computers controlled by the second console if the predetermined keyword is detected; and
    a micro control unit (MCU) coupled to the keyword filter and the capture unit for controlling the keyword filter and the capture unit.

2. The keyboard-video-mouse switch of claim 1, further comprises an alarm controlled by the MCU for alarming an administrator if the predetermined keyword is detected.

3. The keyboard-video-mouse switch of claim 1, further comprising a keyword database, storing data of at least one keystroke combination, defined as predetermined keyword data for at least one input method.

4. The keyboard-video-mouse switch of claim 3, wherein the input method is selected from a group consisting of input method in English, Phonetic input method in Traditional Chinese, Hanzi keyboard input method in Traditional Chinese, Tsang-Jye input method in Traditional Chinese, Hanzi keyboard input method in Simplified Chinese, Roma-ji input method in Japanese, hand-write input method and voice input method.

5. The keyboard-video-mouse switch of claim 3, wherein the keyword filter detects the predetermined keyword by comparing keyboard input data from the second console with the predetermined keyword data stored in the keyword database.

6. The keyboard-video-mouse switch of claim 1, wherein the capture unit further records keyboard input data from the second console.

7. The keyboard-video-mouse switch of claim 1, further comprising a storage device, storing the video data from the computers.

8. The keyboard-video-mouse switch of claim 7, wherein the storage device is a memory in the keyboard-video-mouse switch.

9. The keyboard-video-mouse switch of claim 7, wherein the storage device is coupled to the keyboard-video-mouse switch via a network.

10. The keyboard-video-mouse switch of claim 7, wherein the capture unit further records keyboard input data from the console.

11. The keyboard-video-mouse switch of claim 10, wherein the storage device is employed to store the video data and the keyboard input data.

12. A keyboard-video-mouse (KVM) switch coupled with a plurality of computers, a first console and a second console, the keyboard-video-mouse switch comprising:
    a first console interface coupled to the first console, which monitors the video data from one of the computers, and monitors an input data from the second console;
    a second console interface coupled to the second console;

a keyword filter within the KVM switch, detecting whether a predetermined keyword is inputted from the second console into one of the computers;

a capture unit for capturing the keyboard input data from the second console and capturing video data from the one of the computers controlled by the second console;

a micro control unit (MCU) coupled with the keyword filter and the capture unit for controlling the keyword filter and the capture unit; and an alarm controlled by the MCU for alarming an administrator if the predetermined keyword is detected.

13. The keyboard-video-mouse switch of claim 12, further comprising a keyword database, storing data of at least one keystroke combination, defined as predetermined keyword data for at least one input method.

14. The keyboard-video-mouse switch of claim 13, wherein the input method is selected from a group consisting of input method in English, Phonetic input method in Traditional Chinese, Hanzi keyboard input method in Traditional Chinese, Tsang-Jye input method in Traditional Chinese, Hanzi keyboard input method in Simplified Chinese, Roma-ji input method in Japanese, hand-write input method and voice input method.

15. The keyboard-video-mouse switch of claim 13, wherein the keyword filter detects the predetermined keyword by comparing keyboard input data from the second console with the predetermined keyword data stored in the keyword database.

16. The keyboard-video-mouse switch of claim 12, wherein the capture unit records the video data from the one of the computers if the predetermined keyword is detected.

17. The keyboard-video-mouse switch of claim 16, further comprising a storage device, storing the video data from the one of the computers.

18. The keyboard-video-mouse switch of claim 17, wherein the storage device is a memory in the keyboard-video-mouse switch.

19. The keyboard-video-mouse switch of claim 17, wherein the storage device is coupled to the keyboard-video-mouse switch via a network.

20. The keyboard-video-mouse switch of claim 16, wherein the capture unit further records keyboard input data from the second console.

21. The keyboard-video-mouse switch of claim 20, wherein the storage device is employed to store the video data and the keyboard input data.

22. A method capable of detecting keyword input for a keyboard-video-mouse (KVM) switch coupling a plurality of computers to a first console and a second console, the method comprising steps of:

coupling a first console interface to the first console, which monitors the video data from one of the computers, and monitors an input data from the second console;

coupling a second console interface to the second console;

detecting whether a predetermined keyword is inputted from the second console into one of the computers by a keyword filter within the KVM switch;

recording video data from the one of the computers controlled by the second console by a capture unit coupled to the keyword filter if the predetermined keyword is detected, the capture unit capturing the keyboard input data from the second console and capturing the video data from the one of the computers controlled by the second console; and controlling the keyword filter and the capture unit by a micro control unit (MCU) coupled to the keyword filter and the capture unit.

23. The method of claim 22, further comprising a step of storing the video data after the recording step.

24. The method of claim 22, further comprising a step of alarming an administrator after the recording step by an alarm controlled by the MCU.

25. The method of claim 22, further recording keyboard input data from the second console during the step of recording the video data.

26. The method of claim 22, wherein the keyword filter further comprises a keyword database, storing data of at least one keystroke combination, defined as predetermined keyword data.

27. The method of claim 26, further comprising a step of comparing keyboard input data from the second console with the predetermined keyword data in the keyword database before the detecting step.

28. The keyboard-video-mouse switch of claim 1, wherein the capture unit further transmits the captured keyboard input data and captured video data to the first console interface.

29. The keyboard-video-mouse switch of claim 12, wherein the capture unit further transmits the captured keyboard input data and captured video data to the first console interface.

30. The method of claim 22, wherein the capture unit further transmits the captured keyboard input data and captured video data to the first console interface.

* * * * *